United States Patent
Park

(10) Patent No.: US 10,243,499 B2
(45) Date of Patent: Mar. 26, 2019

(54) MOTOR DRIVING APPARATUS AND HOME APPLIANCE INCLUDING THE SAME

(71) Applicant: LG ELECTRONICS INC., Seoul (KR)

(72) Inventor: Cheonsu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/253,213

(22) Filed: Aug. 31, 2016

(65) Prior Publication Data

US 2017/0063275 A1  Mar. 2, 2017

(30) Foreign Application Priority Data

Aug. 31, 2015  (KR) .................. 10-2015-0122849

(51) Int. Cl.
| | |
|---|---|
| *H02P 27/08* | (2006.01) |
| *F25B 49/02* | (2006.01) |
| *H02P 29/62* | (2016.01) |
| *H02P 23/02* | (2006.01) |
| *H02P 8/36* | (2006.01) |

(52) U.S. Cl.
CPC ............ *H02P 27/08* (2013.01); *F25B 49/025* (2013.01); *H02P 29/62* (2016.02); *F25B 2600/021* (2013.01); *F25B 2600/024* (2013.01); *F25B 2700/2115* (2013.01); *F25B 2700/21152* (2013.01)

(58) Field of Classification Search
CPC .. H02P 23/02; H02P 25/06; H02P 8/36; H02P 29/00; F25B 49/02
See application file for complete search history.

(56) References Cited

U.S. PATENT DOCUMENTS

| | | | |
|---|---|---|---|
| 2013/0271060 A1 | 10/2013 | Messersmith et al. | |
| 2014/0009099 A1* | 1/2014 | Greetham | ............... H02P 1/465 318/558 |
| 2014/0015461 A1* | 1/2014 | Ohba | ...................... H02P 29/62 318/472 |

(Continued)

FOREIGN PATENT DOCUMENTS

| | | |
|---|---|---|
| CN | 202663335 U | 1/2013 |
| EP | 1271071 A1 | 1/2003 |

(Continued)

*Primary Examiner* — Eduardo Colon Santana
*Assistant Examiner* — Said Bouziane
(74) *Attorney, Agent, or Firm* — Dentons US LLP

(57) ABSTRACT

A motor driving apparatus and a home appliance including the same. The motor driving apparatus includes a temperature sensing unit to sense a compressor temperature, an inverter including a plurality of switching elements to convert a direct current (DC) voltage into an alternating current (AC) voltage and to supply AC voltage to a motor used to drive the compressor, and a controller to control the inverter. The controller performs control to apply motor preheating current for preheating of the motor during a first period before startup of the motor, and varies depending on the sensed temperature a time during which the motor preheating current is applied or a current application level. A reduction in power consumption during the preheating of the compressor is achieved.

7 Claims, 12 Drawing Sheets

(56) References Cited

U.S. PATENT DOCUMENTS

| | | | | |
|---|---|---|---|---|
| 2014/0182318 A1* | 7/2014 | Eom | ................ | F25B 49/02 |
| | | | | 62/129 |
| 2014/0210396 A1* | 7/2014 | Yamanaka | ......... | H05K 13/0404 |
| | | | | 318/687 |
| 2014/0361721 A1* | 12/2014 | Yamaguchi | ......... | H02P 29/0088 |
| | | | | 318/472 |
| 2015/0192337 A1* | 7/2015 | Choi | ................ | F25B 49/025 |
| | | | | 62/230 |
| 2015/0222216 A1* | 8/2015 | Ogawa | ................ | B60L 3/12 |
| | | | | 318/490 |

FOREIGN PATENT DOCUMENTS

| | | | | | |
|---|---|---|---|---|---|
| EP | 2683073 | A2 | 1/2014 | | |
| EP | 2685628 | A2 | 1/2014 | | |
| FR | 2977412 | A1 | 1/2013 | | |
| JP | 2005326054 | A | 11/2005 | | |
| JP | 2015073361 | A | 4/2015 | | |
| WO | 2007/086648 | A2 | 8/2007 | | |
| WO | WO 2007086648 | A2 * | 8/2007 | ............ | F25B 49/025 |

\* cited by examiner

MOTOR DRIVING APPARATUS AND HOME APPLIANCE INCLUDING THE SAME

CROSS-REFERENCE TO RELATED APPLICATION

This application claims the priority benefit of Korean Patent Application No. 10-2015-0122849, filed on Aug. 31, 2015 in the Korean Intellectual Property Office, the disclosure of which is incorporated herein by reference.

BACKGROUND

1. Field

The present invention relates to a motor driving apparatus and a home appliance including the same, and more particularly, to a motor driving apparatus capable of reducing power consumption for the preheating of a compressor, and a home appliance including the same.

2. Description of the Related Art

A motor driving apparatus drives a motor including a rotor for performing rotation and a stator having a coil wound therearound.

The motor driving apparatus may be used to drive various motors, and in particular, may drive a compressor motor in order to drive a compressor in a home appliance.

SUMMARY

It is an object of the present disclosure to provide a motor driving apparatus capable of reducing power consumption for the preheating of a compressor, and a home appliance including the same.

In accordance with one aspect of the present disclosure, the above and other objects can be accomplished by the provision of a motor driving apparatus including a temperature sensing unit to sense a compressor temperature (e.g., temperature around a compressor), an inverter including a plurality of switching elements to convert a direct current (DC) voltage into an alternating current (AC) voltage by switching operation of the switching elements and to supply the AC voltage to a motor used to drive the compressor, and a controller to control the inverter, wherein the controller performs control to apply motor preheating current for preheating of the motor during a first period before startup of the motor, and varies a time during which the motor preheating current is applied or a current application level depending on the sensed temperature.

In accordance with another aspect of the present disclosure, there is provided a home appliance including a compressor, a temperature sensing unit to sense a compressor temperature (e.g., temperature around the compressor), an inverter including a plurality of switching elements to convert a direct current (DC) voltage into an alternating current (AC) voltage by switching operation of the switching elements and to supply the AC voltage to a motor used to drive the compressor, and a controller to control the inverter, wherein the controller performs control to apply motor preheating current for preheating of the motor during a first period before startup of the motor, and varies a time during which the motor preheating current is applied or a current application level depending on the sensed temperature.

BRIEF DESCRIPTION OF THE DRAWINGS

The embodiments will be described in detail with reference to the following drawings in which like reference numerals refer to like elements wherein.

DETAILED DESCRIPTION

Figure 1:
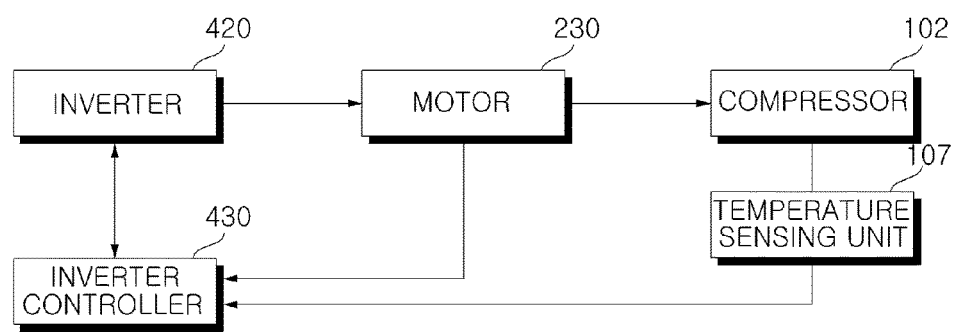
FIG. 1 is an internal block diagram illustrating an example of a motor driving apparatus according to an embodiment of the present invention.

Hereinafter, embodiments of the present invention will be described in more detail with reference to the drawings.

With respect to constituent elements used in the following description, suffixes "module" and "unit" are given or mingled with each other only in consideration of ease in the preparation of the specification, and do not have or serve as different meanings. Accordingly, the "module" and "unit" may be used interchangeably.

A motor driving apparatus described in this specification refers to a motor driving apparatus for driving a compressor motor.

Meanwhile, a motor driving apparatus, designated by reference numeral 220, according to an embodiment of the present invention may be referred to as a motor driving unit.

FIG. 1 is an internal block diagram illustrating an example of a motor driving apparatus according to an embodiment of the present invention.

Explaining with reference to FIG. 1, the motor driving apparatus 220 according to the embodiment of the present invention may serve to drive a motor 230 for driving a compressor 102, and may include an inverter 420, an inverter controller 430, motor 230, compressor 102, and a temperature sensing unit 107. In one embodiment, temperature sensing unit 107 may include, but is not limited to, a Negative Temperature Coefficient (NTC) thermistor, a Resistance Temperature Detector (RTD), a thermocouple, or a semiconductor-based sensor.

Temperature sensing unit 107 may sense the temperature around compressor 102. In particular, temperature sensing unit 107 may sense the refrigerant discharge temperature $T_d$ from compressor 102. To this end, temperature sensing unit 107 may be located around a refrigerant discharge portion outside compressor 102.

Meanwhile, inverter controller 430 may receive the sensed temperature $T_d$ from temperature sensing unit 107.

Inverter controller 430 may apply motor preheating current for preheating motor 230 during a first period before the startup of motor 230, and may vary the time during which the motor preheating current is applied or the current application level based on the sensed temperature $T_d$.

In this way, compared to a conventional method in which constant current flows in motor 230 during a predetermined time regardless of the temperature of compressor 102, embodiments of the present invention may reduce power consumption during the preheating of compressor 102.

In particular, inverter controller 430 increases the time, during which motor preheating current is applied, or the current application level as the temperature $T_d$ sensed by temperature sensing unit 107 is reduced. And inverter controller 430 reduces the time, during which motor preheating current is applied, or the current application level as the temperature $T_d$ sensed by temperature sensing unit 107 is increased, thereby reducing power consumption during the preheating of compressor 102 depending on the temperature on the discharge side of compressor 102.

Figure 2A:
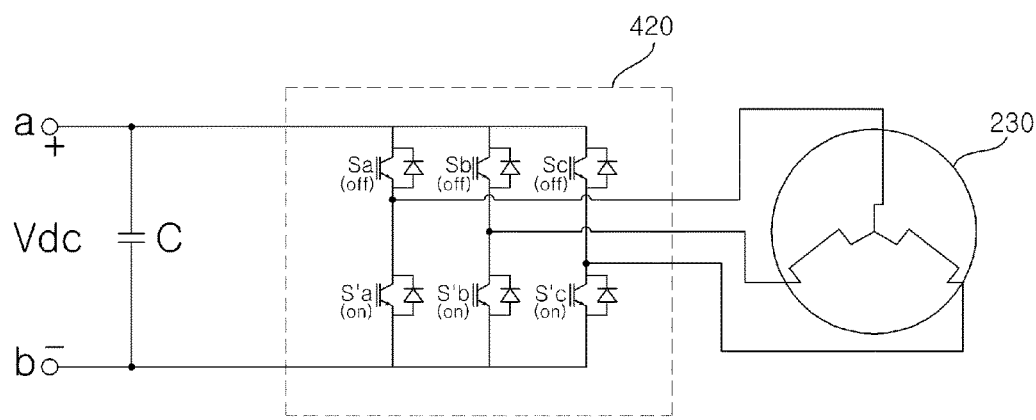
FIGS. 2A and 2B are views referenced to explain a compressor preheating method.
Figure 2B:
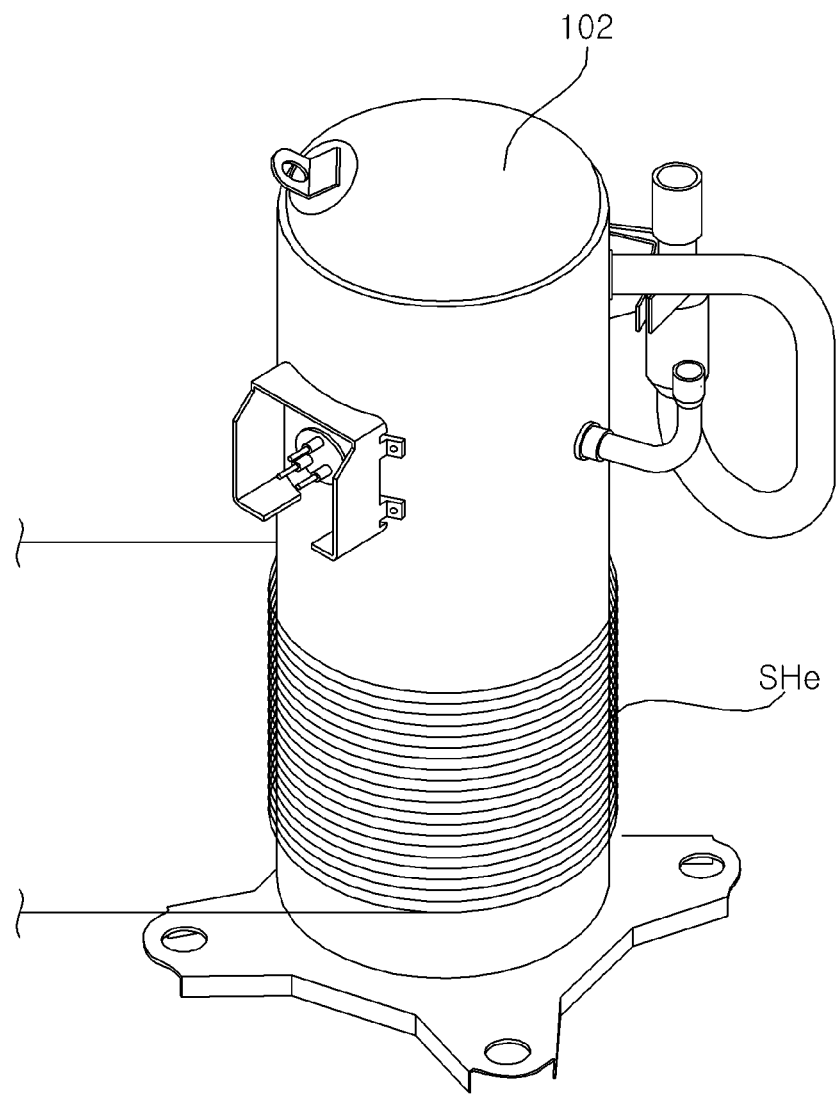

FIGS. 2A and 2B are views referenced to explain a compressor preheating method.

First, FIG. 2A illustrates a method in which current is applied to compressor motor 230 through inverter 420 so that compressor motor 230 generates heat.

Next, FIG. 2B illustrates a method in which a sump heater is located around compressor 102 and heat is transferred to compressor 102 through the sump heater.

The method of FIG. 2B requires a separate sump heater, thus causing an increase in manufacturing costs and the like. Therefore, the present invention adopts the method of FIG. 2A, which requires no separate heater.

In particular, rather than the previously described conventional method in which constant current flows in motor 230 during a predetermined time regardless of the temperature of compressor 102, embodiments of the present invention adopt a method of sensing the temperature $T_d$ around compressor 102 and varying the time during which motor preheating current is applied or the current application level based on the sensed temperature $T_d$. This will be described later with reference to FIGS. 5 and 6.

Figure 3:
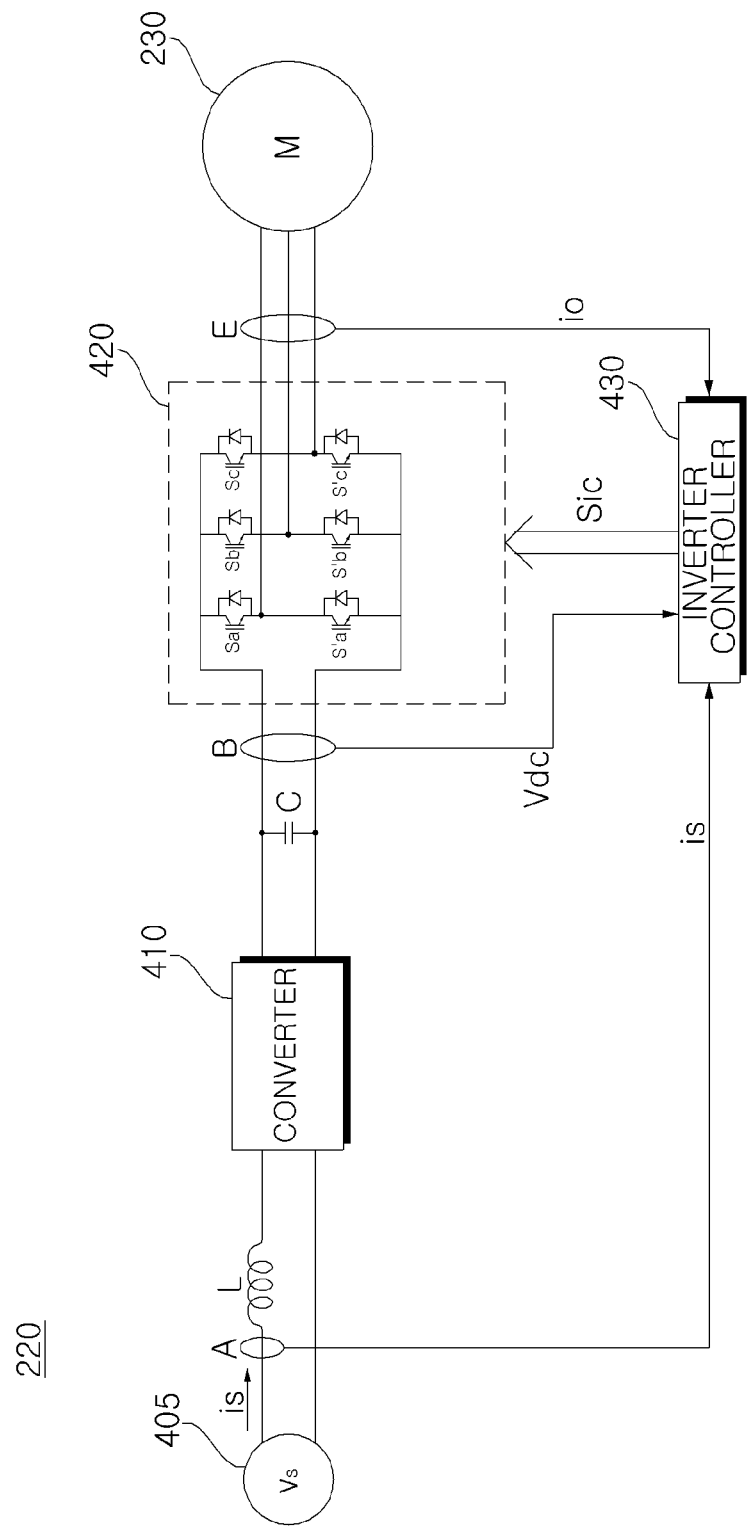
FIG. 3 is an internal circuit diagram illustrating an example of the motor driving apparatus of FIG. 1.

FIG. 3 is an internal circuit diagram illustrating an example of the motor driving apparatus of FIG. 1.

Explaining with reference to FIG. 3, motor driving apparatus 220 according to one embodiment of the present invention may serve to drive a motor in a sensorless manner, and may include inverter 420 and inverter controller 430.

Additionally, motor driving apparatus 220 according to the embodiment of the present invention may further include a converter 410, a dc-terminal voltage detector B, a smoothing capacitor C, and an output current detector E. In addition, motor driving apparatus 220 may further include an input current detector A and a reactor L, for example.

Hereinafter, operations of the respective constituent units inside motor driving apparatus 220 will be described.

The reactor L is located between a commercial AC power source 405 having a voltage $V_s$ and converter 410 to perform power-factor correction and boosting operation. In addition, the reactor L may perform a function for limiting harmonic current by high-speed switching.

The input current detector A may detect input current $i_s$ from commercial AC power source 405. To this end, a current transformer (CT), a shunt resistor, etc. may be used as the input current detector A. The detected input current $i_s$ may be input to inverter controller 430 as a pulse type discrete signal.

Converter 410 may convert the AC voltage of commercial AC power source 405, having passed through the reactor L, into a DC voltage. Although a single-phase AC power source is shown as commercial AC power source 405 in FIG. 3, a three-phase AC power source may be used. The internal structure of converter 410 may be changed depending on the type of commercial AC power source 405.

Converter 410 may include, for example, a diode without a switching element and perform rectification operation without performing separate switching operation.

For example, in a single-phase AC power source, four diodes may be used in the form of a bridge. In a three-phase AC power source, six diodes may be used in the form of a bridge.

Converter 410 may be a half bridge converter in which two switching elements and four diodes are connected to one another. In a three-phase AC power source, six switching elements and six diodes may be used.

When converter 410 includes a switching element, boosting operation, power-factor improvement, and DC voltage conversion may be performed by switching operation of the switching element.

The smoothing capacitor C smooths an input voltage and stores the smoothed voltage. Although one smoothing capacitor C is illustrated in FIG. 3, a plurality of smoothing capacitors may be included in order to ensure stability.

Although the smoothing capacitor is illustrated in FIG. 3 as being connected to the output terminal of converter 410, the DC voltage may be directly input to the smoothing capacitor without being limited thereto. For example, the DC voltage from a solar cell may be input to the smoothing capacitor C directly or after DC/DC conversion. Hereinafter, parts shown in FIG. 3 will be focused upon.

Since the DC voltage is stored in the smoothing capacitor C, both terminals of the smoothing capacitor C may be referred to as dc-terminals or dc-link terminals.

The dc-terminal voltage detector B may detect a dc-terminal voltage $V_{dc}$ between both terminals of the smoothing capacitor C. To this end, the dc-terminal voltage detector B may include a resistor, an amplifier, etc. The detected dc-terminal voltage $V_{dc}$ may be input to inverter controller 430 as a pulse type discrete signal.

Inverter 420 may include a plurality of inverter switching elements and may convert the do voltage $V_{dc}$ smoothed by on/off operation of the switching elements into three-phase AC voltages $V_a$, $v_b$ and $v_c$ having a predetermined frequency and output the three-phase AC voltages to three-phase synchronous motor 230.

Inverter 420 includes upper-arm switching elements Sa, Sb, and Sc and lower-arm switching elements S'a, S'b, and S'c, each pair of an upper-arm switching element and a lower-arm switching element being connected in series, and three pairs of upper-arm and lower-arm switching elements Sa and S'a, Sb and S'b, and Sc and S'c being connected in parallel. Diodes may be connected in anti-parallel to the respective switching elements Sa, S'a, Sb, S'b, Sc, and S'c.

The switching elements in inverter 420 perform on/off operation based on an inverter switching control signal $S_{ic}$ from inverter controller 430. Thus, the three-phase AC voltages having the predetermined frequency are output to three-phase synchronous motor 230.

Inverter controller 430 may control switching operation of inverter 420 in a sensorless manner. To this end, inverter controller 430 may receive output current $i_o$ detected by the output current detector E.

Inverter controller 430 outputs the inverter switching control signal $S_{ic}$ to inverter 420 in order to control switching operation of inverter 420. The inverter switching control signal $S_{ic}$ is generated and output based on the output current $i_o$ detected by the output current detector E, as a pulse width modulation (PMW) switching control signal. A detailed operation for outputting the inverter switching control signal $S_{ic}$ from inverter controller 430 will be described later with reference to FIG. 4.

The output current detector E may detect output current $i_o$ flowing between inverter 420 and three-phase motor 230. That is, the output current detector E detects current flowing to motor 230. The output current detector E may detect all of output current $i_a$, $i_b$ and $i_c$ of respective phases, or may detect two-phase output current based on three-phase balance.

The output current detector E may be located between inverter 420 and motor 230, and may be a current transformer, a shunt resistor, etc. in order to detect current.

When a shunt resistor is used as the output current detector E, three shunt resistors may be located between inverter 420 and synchronous motor 230, or may be connected respectively, at one terminal thereof, to three lower-arm switching elements S'a, S'b and S'c. Alternatively, two shunt resistors may be used based on three-phase balance. Alternatively, when a single shunt resistor is used, the corresponding shunt resistor may be located between the above-described capacitor C and inverter 420.

The detected output current $i_o$ may be applied to inverter controller 430 as a pulse type discrete signal, and the inverter switching control signal $S_{ic}$ may be generated based on the detected output current $i_o$. Hereinafter, assume that the detected output current $i_o$ is made up of three-phase output currents $i_a$, $i_b$, and $i_c$.

Three-phase motor 230 includes a stator and a rotor. The AC voltage of each phase, which has the predetermined frequency, is applied to the coil of the stator of each phase a, b, or c, so as to rotate the rotor.

Motor 230 may include a surface-mounted permanent-magnet synchronous motor (SMPMSM), an interior permanent magnet synchronous motor (IMPSM), and a synchronous reluctance motor (Synrm), for example. The SMPMSM and the IPMSM are permanent magnet synchronous motors (PMSMs) using a permanent magnet, and the Synrm does not include a permanent magnet.

Figure 4:
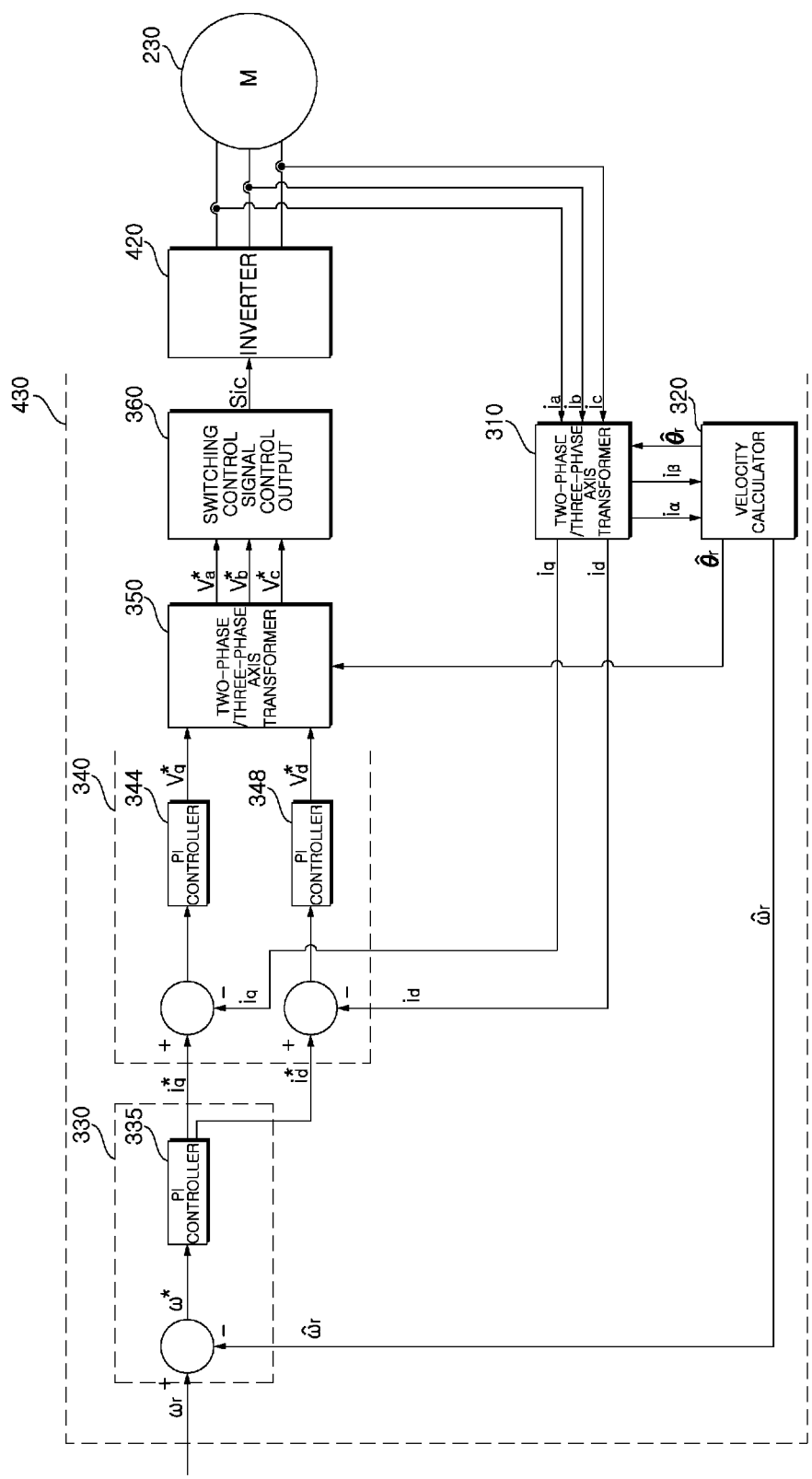
FIG. 4 is an internal block diagram of an inverter controller illustrated in FIG. 3.

FIG. 4 is an internal block diagram of the inverter controller illustrated in FIG. 3.

Referring to FIG. 4, inverter controller 430 may include an axis-transformation unit 310, a speed calculator 320, a current command generator 330, a voltage command generator 340, an axis-transformation unit 350, and a switching control signal output unit 360.

Axis-transformation unit 310 may receive detected three-phase current $i_a$, $i_b$, and $i_c$ from the output current detector E and transform the three-phase current $i_a$, $i_b$, and $i_c$ into two-phase current $i_\alpha$ and $i_\beta$ of a stationary coordinate system.

Axis-transformation unit 310 may transform two-phase current $i_\alpha$ and $i_\beta$ of the stationary coordinate system into two-phase current $i_d$ and $i_q$ of a rotating coordinate system.

Speed calculator 320 may output a calculated position $\hat{\theta}_r$ and a calculated speed $\hat{\omega}_r$ based on the two-phase current $i_\alpha$ and $i_\beta$ of the stationary coordinate system axis-transformed in axis-transformation unit 310.

Current command generator 330 generates a current command value $i^*_q$ based on the calculated speed $\hat{\omega}_r$ and a speed command value $\hat{\omega}_r$. For example, current command generator 330 may perform PI control in a PI controller 335 based on a difference between the calculated speed $\hat{\omega}_r$ and the speed command value $\hat{\omega}_r$ and generate the current command value $i^*_q$. Although a q-axis current command value $i^*_q$ is illustrated as the current command value in FIG. 4, a d-axis current command value $i^*_d$ may also be generated unlike FIG. 4. The value of the d-axis current command value $i^*_d$ may be set to 0.

Current command generator 330 may further include a limiter (not illustrated) for limiting the level of the current command value $i^*_q$ so as not to exceed an allowable range.

Next, voltage command generator 340 generates d-axis and q-axis voltage command values $v^*_d$ and $v^*_q$ based on the d-axis and q-axis current $i_d$ and $i_q$ axis-transformed into the two-phase rotating coordinate system by the axis-transformation unit and the current command values $i^*_d$ and $i^*_q$ from current command generator 330. For example, voltage command generator 340 may perform PI control in a PI controller 344 based on a difference between the q-axis current $i_q$ and the q-axis current command value $i^*_q$ and generate a q-axis voltage command value $v^*_q$. Additionally, voltage command generator 340 may perform PI control in a PI controller 348 based on a difference between the d-axis current $i_d$ and the d-axis current command value $i^*_d$ and generate a d-axis voltage command value $v^*_d$. Voltage command generator 340 may further include a limiter (not illustrated) for limiting the level of the d-axis and q-axis voltage command values $v^*_d$ and $v^*_q$, so as not to exceed an allowable range.

The generated d-axis and q-axis voltage command values $v^*_d$ and $v^*_q$ are input to axis-transformation unit 350.

Axis-transformation unit 350 receives the position $\hat{\theta}_r$ calculated by speed calculator 320 and the d-axis and q-axis voltage command values $v^*_d$ and $v^*_q$ and performs axis-transformation.

First, axis-transformation unit 350 transforms a two-phase rotating coordinate system into a two-phase stationary coordinate system. At this time, the position $\hat{\theta}_r$ calculated by speed calculator 320 may be used.

Then, axis-transformation unit 350 transforms the two-phase stationary coordinate system into a three-phase stationary coordinate system. Through such transformation, axis-transformation unit 1050 outputs three-phase output voltage command values $v^*_a$, $v^*_b$, and $v^*_c$.

Switching control signal output unit 360 generates and outputs an inverter switching control signal $S_{ic}$ via a pulse width modulation (PWM) method based on the three-phase output voltage command values $v^*_a$, $v^*_b$, and $v^*_c$.

The output inverter switching control signal $S_{ic}$ may be converted into a gate drive signal by a gate driver (not illustrated) and input to the gate of each switching element of inverter 420. Accordingly, the switching elements Sa, S'a, Sb, S'b, Sc, and S'c of inverter 420 may perform switching operation.

Figure 5:
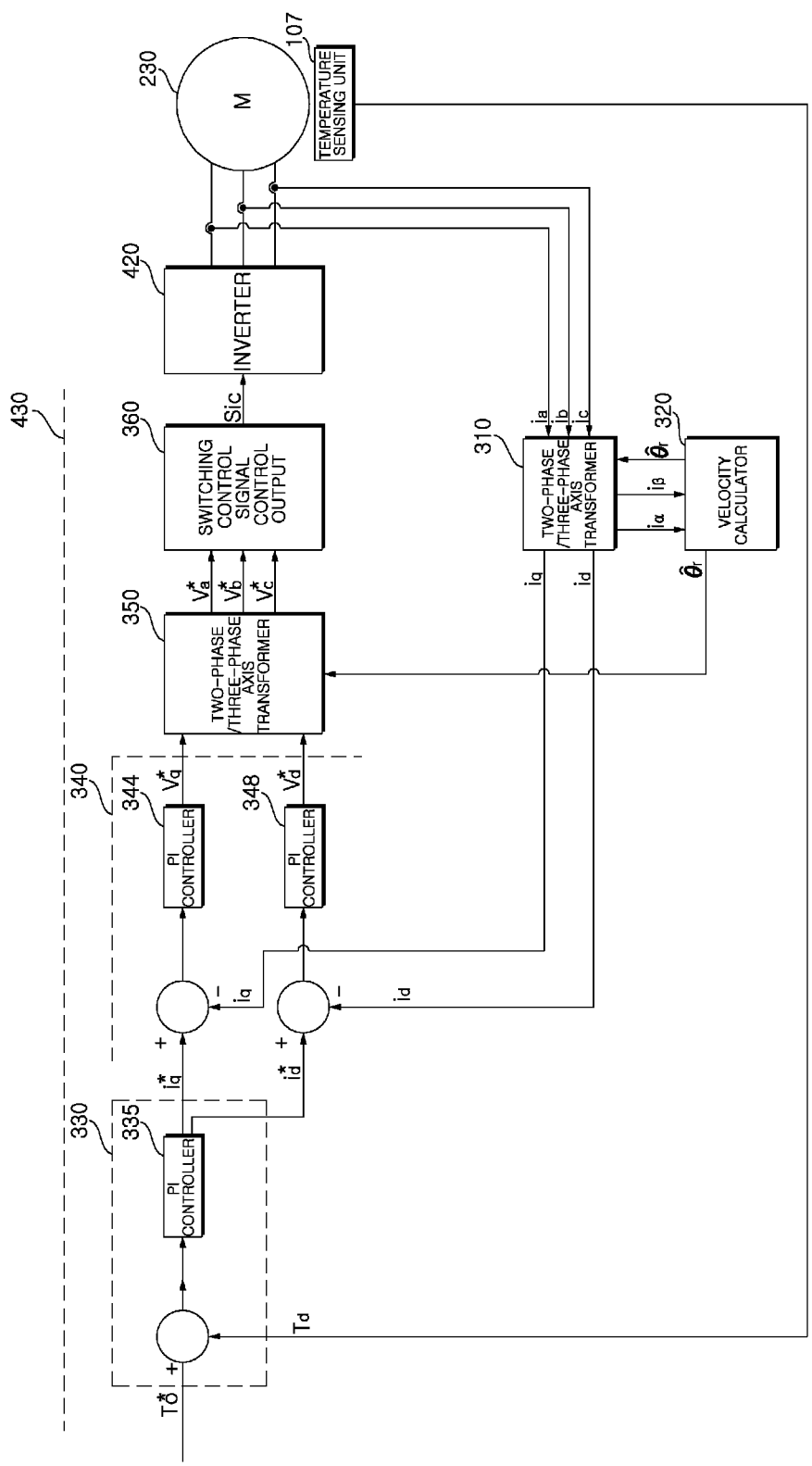
FIG. 5 is an internal block diagram for explaining an operation of the inverter controller during the preheating of a motor.

FIG. 5 is an internal block diagram for explaining an operation of the inverter controller during the preheating of the motor.

Explaining with reference to FIG. 5, inverter controller 430 operates so that motor preheating current flows in compressor motor 230 during a first period before the startup of motor 230.

The output current detector E may not detect output current $i_o$ during the first period before the startup of motor 230. Alternatively, speed calculator 320 may not perform motor rotor position estimation and speed calculation based on output current $i_o$ detected by the output current detector E.

The temperature $T_d$ sensed by temperature sensing unit 107 may be the temperature around compressor 102, and more particularly, the temperature on the discharge side of compressor 102.

The temperature $T_d$ sensed by temperature sensing unit 107 may be applied to current command generator 330 in inverter controller 430.

Current command generator 330 may receive a discharge temperature command value $T^*_o$ via external or internal calculation.

Accordingly, during the first period before the startup of motor 230, current command generator 330 may generate a preheating current command value based on the temperature $T_d$ sensed by temperature sensing unit 107 and the discharge temperature command value $T^*_o$ of compressor 102.

Voltage command generator 340 may generate a preheating voltage command value based on the preheating current command value.

Then, switching control signal output unit 360 may output a preheating switching control signal, which is required in order to cause motor preheating current to flow in motor 230, based on the preheating voltage command value.

At this time, switching control signal output unit 350 may output a preheating switching control signal for turning on one upper-arm switching element among three upper-arm switching elements in inverter 420 and turning on two lower-arm switching elements among three lower-arm switching elements in inverter 420 during the first period.

Accordingly, DC current may flow in motor 230 during the first period, whereby compressor 102 is preheated.

Inverter controller 430 may perform control so that the time during which motor preheating current is applied or the current application level is increased as the sensed temperature $T_d$ is reduced.

In particular, current command generator 330 in inverter controller 430 may perform control so that the time during which motor preheating current is applied or the application level is increased.

In this way, power consumption may be reduced during the preheating of compressor 102.

After the first period, inverter controller 430 may operate as illustrated in FIG. 4.

That is, speed calculator 320 may calculate the speed of motor 230 based on output current flowing in motor 230, current command generator 330 may generate a current command value based on a speed command value and the speed calculated by speed calculator 320, voltage command generator 340 may generate a voltage command value based on the current command value, and switching control signal output unit 360 may output a switching control signal based on the voltage command value.

Figure 6:
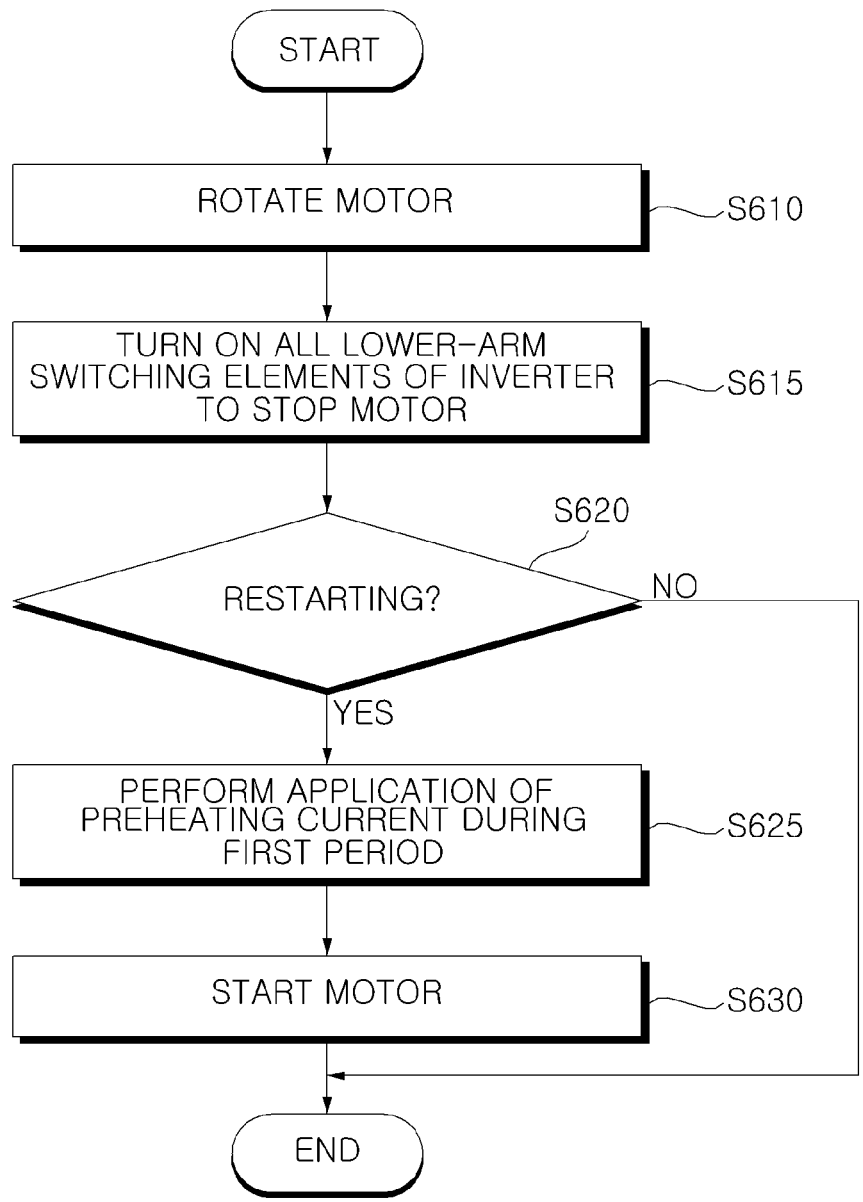
FIG. 6 is a flowchart illustrating a method of operating a motor driving apparatus according to an embodiment of the present invention.
Figure 7:
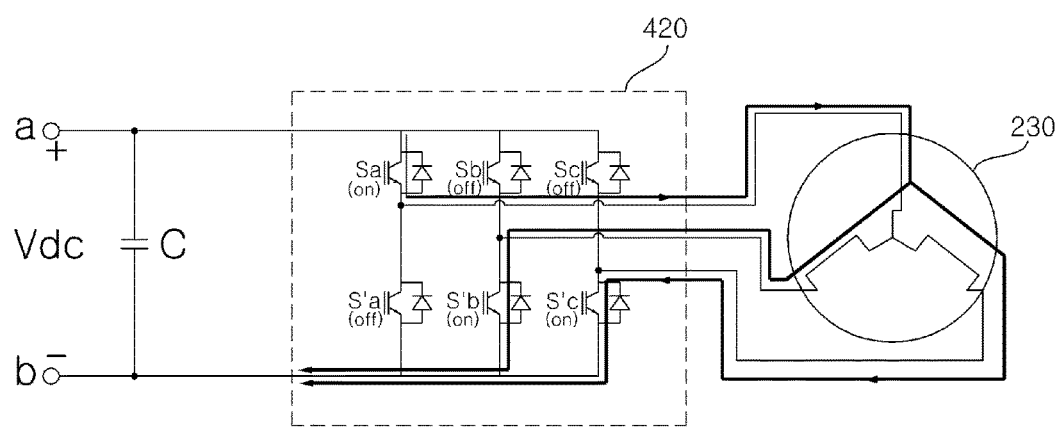
FIGS. 7, 8, and 9 are views referenced to explain the operating method of FIG. 6.
Figure 8:
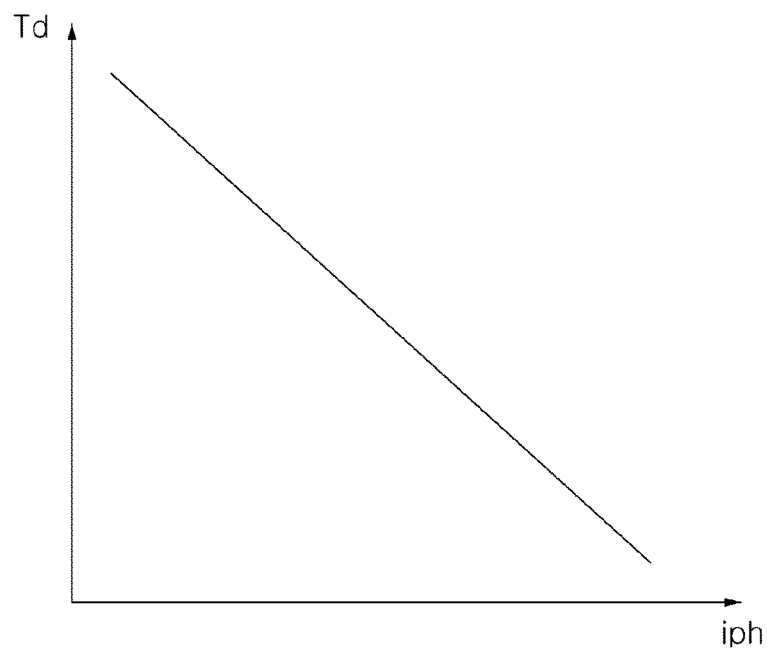
Figure 9:
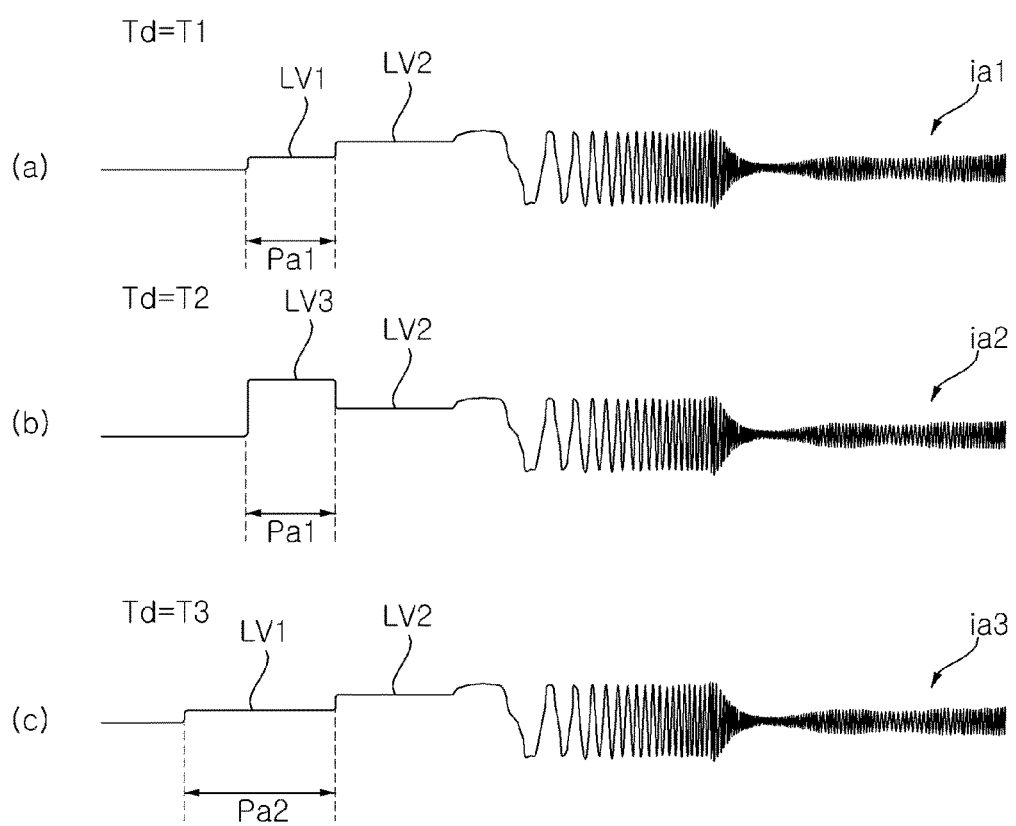

FIG. 6 is a flowchart illustrating a method of operating a motor driving apparatus according to an embodiment of the present invention, and FIGS. 7 to 9 are views referenced to explain the operating method of FIG. 6.

First, referring to FIG. 6, inverter controller 430 performs control to rotate motor 230 (S610).

Next, inverter controller 430 performs control to turn on the lower-arm switching elements S'a, S'b, and S'c, in order to stop motor 230 (S615).

Next, inverter controller 430 performs control to cause preheating current to flow in motor 230 during a first period for the startup of motor 230 (S625) when a motor restarting input is received (S620).

Inverter controller 430 may perform control to turn on one upper-arm switching element among three upper-arm switching elements in inverter 420 and to turn on two lower-arm switching elements among three lower-arm switching elements in inverter 420 during the first period.

FIG. 7 illustrates that, during the first period, only a first upper-arm switching element $S_a$ is turned on and the other second and third upper-arm switching elements $S_b$ and $S_c$ are turned off, and that only a first lower-arm switching element $S'_a$ is turned off and the other second and third lower-arm switching elements $S'_b$ and $S'_a$ are turned on.

Accordingly, constant DC current flows in motor 230, whereby compressor 102 is preheated by preheating current.

Inverter controller 430 may apply motor preheating current for the preheating of motor 230 during the first period before the startup of motor 230, and may vary the time during which motor preheating current is applied or the current application level based on the sensed temperature.

FIG. 8 is a view illustrating the relationship between preheating current $i_{ph}$ and the sensed temperature $T_d$.

Referring to FIG. 8, the magnitude of preheating current $i_{ph}$ is reduced as the sensed temperature $T_d$ is increased, and the magnitude of preheating current $i_{ph}$ is increased as the sensed temperature $T_d$ is reduced.

Accordingly, inverter controller 430 performs control to increase the time during which motor preheating current $i_{ph}$ is applied or the current application level as the sensed temperature $T_d$ is reduced, and performs control to reduce the same as the sensed temperature $T_d$ is increased.

Subsequently, inverter controller 430 starts motor 230 after the first period for motor preheating (S630). This will be described below with reference to FIG. 9.

FIG. 9 is a view illustrating different sensed temperatures $T_d$, the first period, and the startup of the motor after the first period.

In (a), (b), and (c) of FIG. 9, the sensed temperature $T_d$ is represented by T1, T2 and T3 respectively. At this time, it is assumed that T1>T2 and T1>T3. Meanwhile, T2 and T3 may be the same.

First, FIG. 9(a) illustrates that the sensed temperature $T_d$ is T1 and a preheating period is a first period Pa1. As described above, inverter controller 430 performs control to cause constant direct current having a level LV1 to flow in motor 230.

In order to start the motor, the first period Pa1 is followed by a motor alignment period, a motor speed increasing period, and an ordinary motor operating period.

During the motor alignment period, direct current having a level LV2 or direct current having a greater level than the level LV2 may be applied.

The level LV1, which is the level of preheating current, may be smaller than the level LV2 of direct current during the motor alignment period.

Next, FIG. 9(b) illustrates that the sensed temperature $T_d$ is T2 and a preheating period is the first period Pa1 as in FIG. 9(a).

Because the sensed temperature $T_d$ is lower than in FIG. 9(a), inverter controller 430 may perform control to cause constant direct current, which has a level LV3 greater than the level LV1, to flow in motor 230.

At this time, the level LV3, which is the level of preheating current, may be greater than the level LV2 of direct current during the motor alignment period.

FIG. 9(c) illustrates that the sensed temperature $T_d$ is T3 and that the level of preheating current is the level LV1 as in FIG. 9(a).

However, a preheating period is a first period Pa2, which is longer than the period Pa1, unlike in FIG. 9(a).

Because the sensed temperature $T_d$ is lower than in FIG. 9(a), the inverter controller 430 may perform control to increase the time during which preheating current is applied.

Meanwhile, the method of operating motor driving apparatus 220 described above may be applied to various home appliances. In particular, the operating method may be applied to home appliances having compressor 102. Although an air conditioner and a refrigerator are exemplified below, the operating method may be applied to other home appliances, such as a water purifier.

Figure 10:
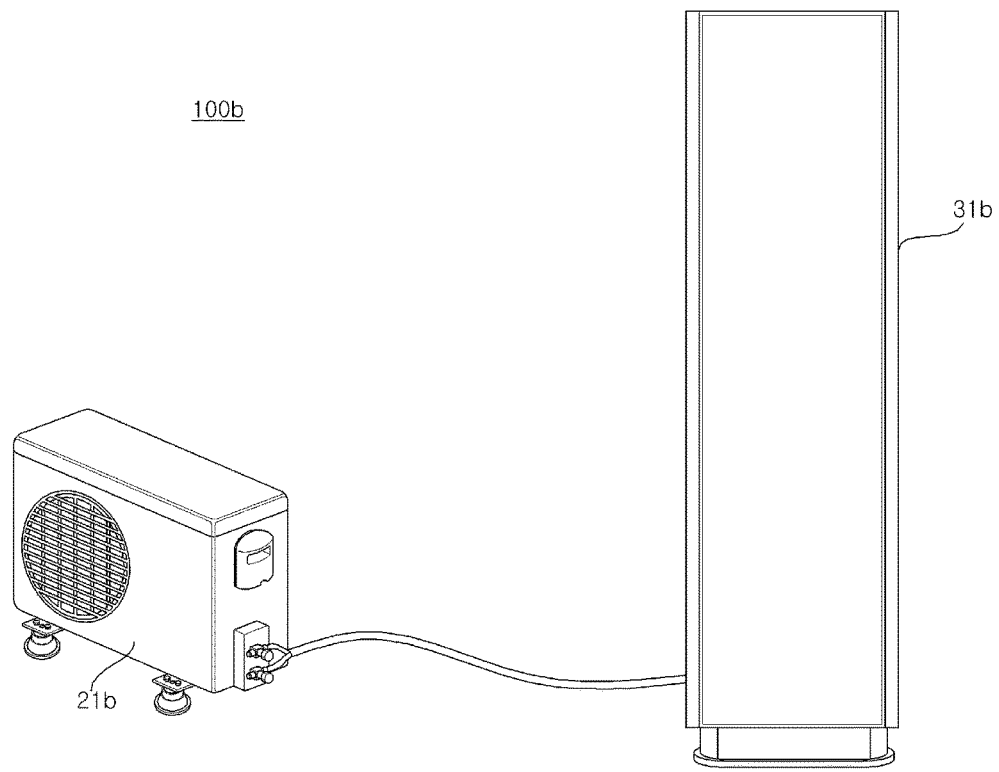
FIG. 10 is a view illustrating the configuration of an air conditioner, which is an example of a home appliance according to an embodiment of the present invention.

FIG. 10 is a view illustrating the configuration of an air conditioner, which is an example of a home appliance according to an embodiment of the present invention.

Air conditioner 100*b* according to the present invention, as illustrated in FIG. 10, may include an indoor unit 31*b* and an outdoor unit 21*b* connected to indoor unit 31*b*.

While indoor unit 31*b* of the air conditioner may be any one of stand type, wall mount type, and ceiling type air conditioners, FIG. 10 illustrates stand type indoor unit 31*b*.

Air conditioner 100*b* may further include at least one of a ventilator, an air purifier, a humidifier, and a heater, which may be operatively connected to the indoor unit and the outdoor unit.

Outdoor unit 21*b* includes a compressor (not illustrated) for compressing a refrigerant, an outdoor heat exchanger (not illustrated) for performing heat exchange between the refrigerant and outdoor air, an accumulator (not illustrated) for extracting gaseous refrigerant from the refrigerant and supplying the extracted gaseous refrigerant to the compressor, and a four-way valve (not illustrated) for changing the flow path of refrigerant based on a heating operation. In addition, while outdoor unit 21*b* may further include a plurality of sensors, a valve, and an oil collector, description thereof will be omitted herein.

Outdoor unit 21*b* operates the compressor and the outdoor heat exchanger included therein to compress the refrigerant or perform heat exchange based on settings and to supply the compressed or heat-exchanged refrigerant to indoor unit 31*b*. Outdoor unit 21*b* may be driven in response to the demand of a remote control unit (not illustrated) or indoor unit 31*b*. At this time, as the cooling/heating capacity of air conditioner 100*b* varies based on the indoor unit which is driven, the number of driven outdoor units and the number of driven compressors installed in outdoor units may be changed.

In this case, outdoor unit 21*b* supplies the compressed refrigerant to connected indoor unit 31*b*.

Indoor unit 31*b* receives the refrigerant from outdoor unit 21*b* to discharge cool or hot air into a room. Indoor unit 31*b* includes an indoor heat exchanger (not illustrated), an indoor fan (not illustrated), an expansion valve (not illustrated) for expanding the refrigerant, and a plurality of sensors (not illustrated).

Outdoor unit 21*b* and indoor unit 31*b* are connected to each other via communication cables to exchange data with each other. The outdoor unit and the indoor unit are connected to the remote control unit (not illustrated) by wire or wirelessly to operate under control of the remote control unit (not illustrated).

A remote controller (not illustrated) is connected to indoor unit 31*b* to allow a user to input a control command for controlling the indoor unit and to receive and display state information on the indoor unit. In this case, the remote controller may communicate with the indoor unit in a wired or wireless manner depending on how the remote controller is connected to indoor unit 31*b*.

Figure 11:
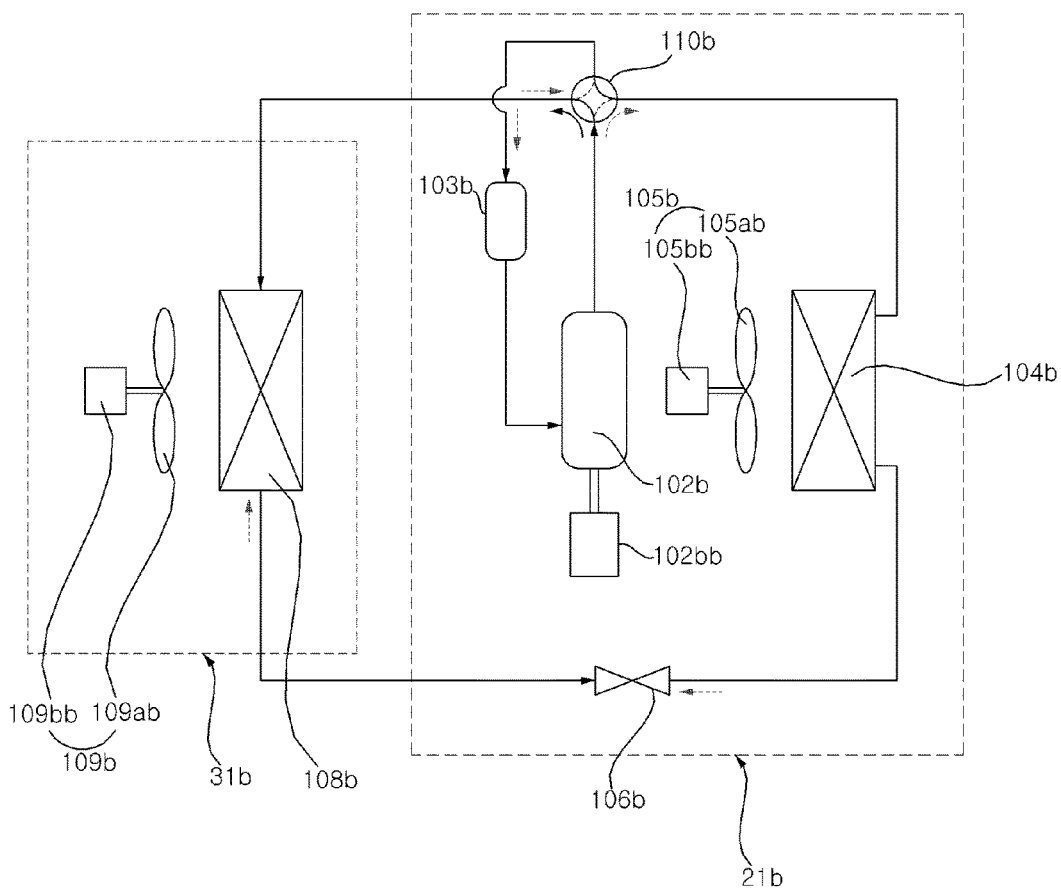
FIG. 11 is a schematic view of an outdoor unit and an indoor unit of FIG. 10.

FIG. 11 is a schematic view of the outdoor unit and the indoor unit of FIG. 10.

Explaining with reference to FIG. 11, air conditioner 100*b* is broadly divided into indoor unit 31*b* and outdoor unit 21*b*.

Outdoor unit 21*b* includes a compressor 102*b* for compressing a refrigerant, a compressor motor 102*bb* for driving the compressor, an outdoor heat exchanger 104*b* for dissipating heat from the compressed refrigerant, an outdoor blower 105*b* including an outdoor fan 105*ab* disposed at one side of outdoor heat exchanger 104*b* to accelerate heat dissipation of the refrigerant and an outdoor fan motor 105*bb* for rotating outdoor fan 105*ab*, an expansion unit 106*b* for expanding the condensed refrigerant, a cooling/heating switching valve 110*b* for changing the flow path of the compressed refrigerant, and an accumulator 103*b* for temporarily storing the gaseous refrigerant to remove moisture and foreign substances from the refrigerant and supplying the refrigerant to the compressor at a predetermined pressure.

Indoor unit 31*b* includes an indoor heat exchanger 108*b* disposed in a room to perform a cooling/heating function, and an indoor blower 108*b* including an indoor fan 109*ab* disposed at one side of indoor heat exchanger 109*b* to accelerate heat dissipation of the refrigerant and an indoor fan motor 109*bb* for rotating indoor fan 109*ab*.

At least one indoor heat exchanger 109*b* may be provided. At least one of an inverter compressor and a constant-speed compressor may be used as compressor 102*b*.

Additionally, air conditioner 100*b* may be configured as a cooler for cooling the room, or may be configured as a heat pump for cooling or heating the room.

Compressor 102*b* of outdoor unit 21*b* of FIG. 10 may be driven by the motor driving apparatus for driving compressor motor 230 illustrated in FIG. 1.

Figure 12:
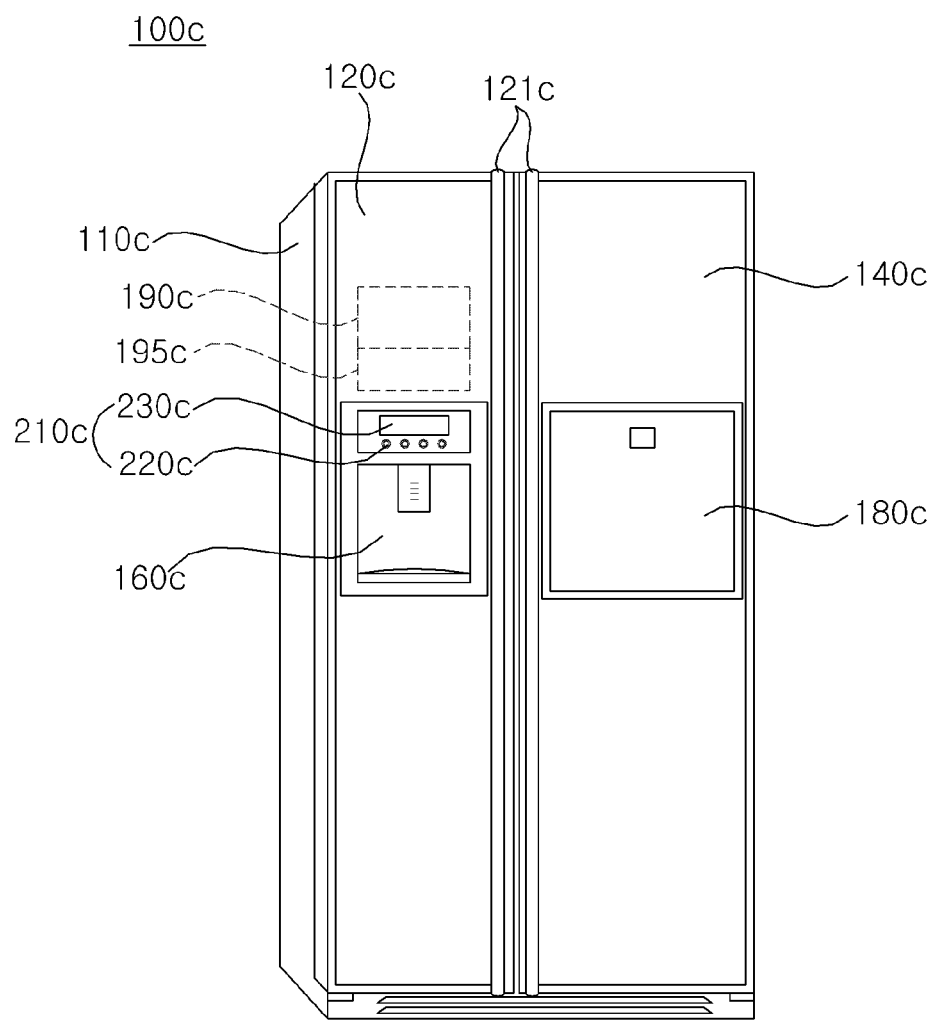
FIG. 12 is a perspective view illustrating a refrigerator, which is another example of a home appliance according to an embodiment of the present invention.

FIG. 12 is a perspective view illustrating a refrigerator, which is another example of a home appliance according to an embodiment of the present invention.

Explaining with reference to FIG. 12, refrigerator 100*c* related to the present invention includes a case 110*c*, which has an inner space divided into a freezing compartment and a refrigerating compartment (not illustrated), a freezing compartment door 120*c* to shield the freezing compartment, and a refrigerating compartment door 140*c* to shield the refrigerating compartment, case 110*c* and doors 120*c* and 140*c* defining the external appearance of the refrigerator.

Freezing compartment door 120*c* and refrigerating compartment door 140*c* may be provided at front surfaces thereof with forwardly protruding door handles 121*c* to assist the user in easily pivoting freezing compartment door 120*c* and refrigerating compartment door 140*c* by gripping door handles 121*c*.

Refrigerating compartment door 140*c* may further be provided at the front surface thereof with a so-called home bar 180*c*, which allows the user to conveniently retrieve stored items, such as beverages, without opening refrigerating compartment door 140*c*.

Freezing compartment door 120*c* may further be provided at the front surface thereof with a dispenser 160*c*, which allows the user to easily and conveniently retrieve ice or drinking water without opening freezing compartment door 120*c*. Freezing compartment door 120*c* may further be provided with a control panel 210*c* at the upper side of dispenser 160*c*. Control panel 210*c* serves to control driving operation of refrigerator 100*c* and to display a screen showing the current operating state of refrigerator 100*c*.

While dispenser 160*c* is illustrated in FIG. 12 as being located at the front surface of freezing compartment door 120*c*, the present invention is not limited thereto and dispenser 160*c* may be located at the front surface of refrigerating compartment door 140*c*.

In addition, the freezing compartment (not illustrated) may accommodate, in an upper region thereof, an icemaker 190*c* used to make ice using water supplied thereto and cold air within the freezing compartment and an ice bank 195*c* located under icemaker 190*c* to receive ice released from icemaker 190*c*. Although not illustrated in FIG. 12, an ice chute (not illustrated) may be used to guide the ice received in ice bank 195*c* to fall into dispenser 160*c*.

Control panel 210*c* may include an input unit 220*c* having a plurality of buttons and a display unit 230*c* to display control screens, operating states, and the like.

Display unit 230*c* displays control screens, operating states, and other information, such as the temperature in the refrigerator, etc. For example, display unit 230*c* may display a service type of the dispenser (ice cubes, water, crushed ice), the set temperature in the freezing compartment, and the set temperature in the refrigerating compartment.

Display unit 230*c* may be any one of liquid crystal display (LCD), light emitting diode (LED), and organic light emitting diode (OLED) units, and the like. Display unit 230*c* may be a touchscreen that may additionally perform a function of input unit 220*c*.

Input unit 220*c* may include a plurality of operation buttons. For example, input unit 220*c* may include a dispenser setting button (not illustrated) to set a service type of the dispenser (ice cubes, water, crushed ice), a freezing compartment temperature setting button (not illustrated) to set the temperature in the freezing compartment, and a refrigerating compartment temperature setting button (not illustrated) to set the temperature in the refrigerating compartment. In addition, input unit 220*c* may be a touchscreen that may additionally perform a function of display unit 230*c*.

The refrigerator according to one embodiment of the present invention is not limited to a double door type illustrated in FIG. 12, and may be any one of a one door type refrigerator, a sliding door type refrigerator, a curtain door type refrigerator and others.

Figure 13:
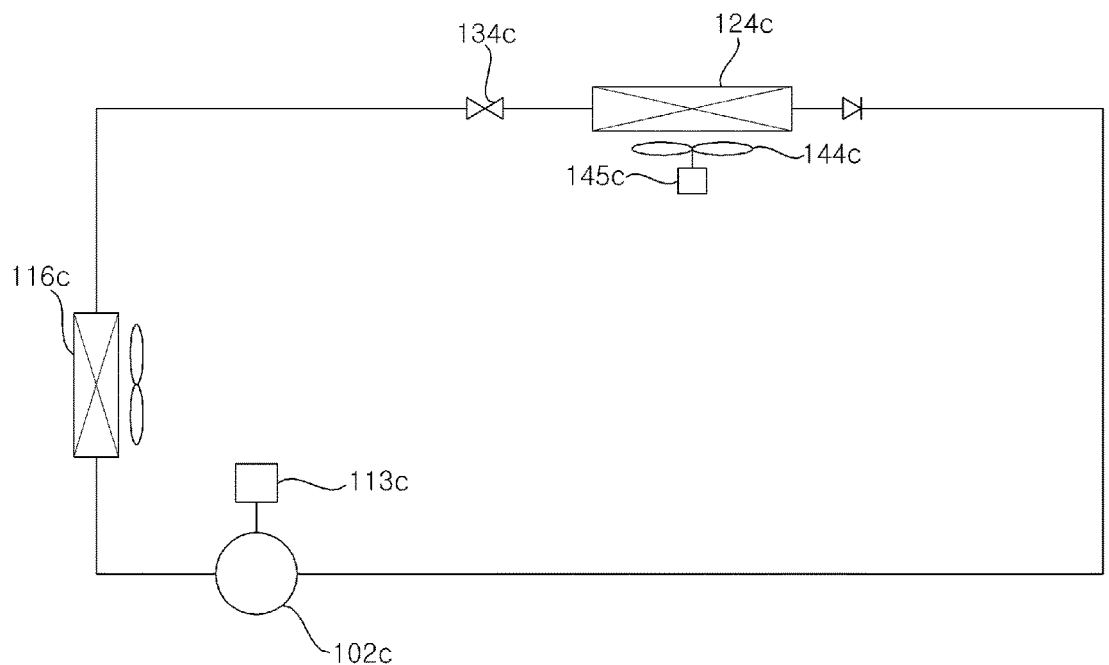
FIG. 13 is a diagrammatic view illustrating the configuration of the refrigerator of FIG. 12.

FIG. 13 is a diagrammatic view illustrating the configuration of the refrigerator of FIG. 12.

Explaining with reference to FIG. 13, refrigerator 100*c* may include a compressor 102*c*, a condenser 116*c* to condense refrigerant compressed in compressor 102*c*, a freezing compartment evaporator 124*c* placed in the freezing compartment (not illustrated) to evaporate the condensed refrigerant directed from condenser 116*c*, and a freezing compartment expansion valve 134*c* to expand the refrigerant to be directed to freezing compartment evaporator 124*c*.

While FIG. 13 illustrates use of a single evaporator by way of example, evaporators may be respectively placed in the freezing compartment and the refrigerating compartment.

That is, refrigerator 100*c* may further include a refrigerating compartment evaporator (not illustrated) placed in the refrigerating compartment (not illustrated), a 3-way valve (not illustrated) to direct the condensed refrigerant from condenser 116*c* to the refrigerating compartment evaporator (not illustrated) or freezing compartment evaporator 124*c*, and a refrigerating compartment expansion valve (not illustrated) to expand the refrigerant to be directed to the refrigerating compartment evaporator (not illustrated).

In addition, refrigerator 100*c* may further include a gas-liquid separator (not illustrated) in which the refrigerant having passed through freezing compartment evaporator 124*c* is divided into liquid and gas.

Refrigerator 100*c* may further include a refrigerating compartment fan (not illustrated) and a freezing compartment fan 144*c*, which suction cold air having passed through freezing compartment evaporator 124*c* and blow the cold air to the refrigerating compartment (not illustrated) and the freezing compartment (not illustrated) respectively.

Refrigerator 100*c* may further include a compressor drive unit 113*c* to drive compressor 102*c*, a refrigerating compartment fan drive unit (not illustrated) to drive the refrigerating compartment fan (not illustrated), and a freezing compartment fan drive unit 145*c* to drive freezing compartment fan 144*c*.

Meanwhile, in the case in which common evaporator 124*c* is used in the freezing compartment and the refrigerating compartment as shown in FIG. 13, a damper (not illustrated) may be installed between the freezing compartment and the refrigerating compartment, and a fan (not illustrated) may forcibly blow cold air generated by the single evaporator to the freezing compartment and the refrigerating compartment.

Compressor 102*c* of FIG. 13 may be driven by the motor driving apparatus for driving the compressor motor illustrated in FIG. 1.

The motor driving apparatus and the home appliance including the same according to the embodiments of the present invention are not limited to the configurations and methods of the above-described embodiments, and all or some of the respective embodiments may be selectively combined with one another in order to realize various alterations of the above-described embodiments.

Meanwhile, a motor driving method and a home appliance operating method according to the present invention may be implemented as a code that can be written on a processor readable medium and thus can be read by a processor included in the motor driving apparatus or the home appliance. The processor readable medium includes all kinds of recording devices in which data is stored in a processor readable manner.

As is apparent from the above description, according to an embodiment of the present invention, a motor driving apparatus includes a temperature sensing unit to sense a temperature around a compressor, an inverter including a plurality of switching elements and to convert a direct current (DC) voltage into an alternating current (AC) voltage by switching operation of the switching elements and to supply the AC voltage to a motor used to drive the compressor, and a controller to control the inverter, and the controller performs control to apply motor preheating current for preheating of the motor during a first period before startup of the motor, and varies a time during which the motor preheating current is applied or a current application level depending on the sensed temperature, thereby reducing power consumption during the preheating of the compressor.

In particular, the time during which the motor preheating current is applied or the current application level may be controlled so as to be increased as the sensed temperature is reduced, or may be controlled so as to be reduced as the sensed temperature is increased. Thereby, power consumption during the preheating of the compressor may be reduced depending on the temperature on the discharge side of the compressor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition, alternatives uses will also be apparent to those skilled in the art.

What is claimed is:

1. A motor driving apparatus comprising:
a temperature sensing unit located around a refrigerant discharge portion outside a compressor to sense a refrigerant discharge temperature from the compressor;
an inverter including a plurality of switching elements to convert a direct current (DC) voltage into an alternating current (AC) voltage and to supply the AC voltage to a motor used to drive the compressor;
an output current detector to detect output current flowing in the motor; and
a controller to control the inverter based on the output current flowing in the motor,
wherein the controller performs control to apply motor preheating current for preheating of the motor based on a discharge temperature command value of the compressor during a first period for preheating before startup of the motor, and depending on the sensed temperature varies (a) a time during which the motor preheating current is applied or (b) a current application level,
wherein the controller performs control to increase the time during which the motor preheating current is applied or to increase the current application level, as the sensed temperature is reduced,
wherein the output current detector does not detect preheating current during the first period,
wherein the controller controls a motor alignment period, a motor speed increasing period, and an ordinary motor operating period to be performed after the first period,
wherein the controller performs start the motor after the first period,
when the sensed temperature is a first temperature, the controller performs control to cause constant direct current having a first level to flow in the motor during the first period, performs control to cause direct current having a second level which is greater than the first level to flow in the motor during the motor alignment period,
when the sensed temperature is a second temperature which is lower than the first temperature, the controller performs control to cause constant direct current having a third level which is greater than the first level and the second level to flow in the motor during the first period,
wherein the controller includes:
a current command generator to generate a preheating current command value, based on the temperature sensed by the temperature sensing unit and the discharge temperature command value of the compressor, during the first period;
a voltage command generator to generate a preheating voltage command value based on the preheating current command value during the first period;
a switching control signal output unit to output a preheating switching control signal, based on the preheating voltage command value, for allowing the motor preheating current to flow in the motor during the first period; and
a speed calculator to calculate a speed of the motor based on the output current flowing in the motor after the first period,
wherein the current command generator generates a current command value based on a speed command value and the speed calculated by the speed calculator after the first period,
wherein the voltage command generator generates a voltage command value based on the current command value after the first period, and
wherein the switching control signal output unit outputs a switching control signal based on the voltage command value after the first period.

2. The motor driving apparatus of claim 1, wherein the controller performs control to turn on one upper-arm switching element among three upper-arm switching elements in the inverter and to turn on two lower-arm switching elements among three lower-arm switching elements in the inverter during the first period.

3. The motor driving apparatus of claim 1, wherein the switching control signal output unit outputs the preheating switching control signal to turn on one upper-arm switching element among three upper-arm switching elements in the inverter and to turn on two lower-arm switching elements among three lower-arm switching elements in the inverter during the first period.

4. A home appliance comprising:
a compressor;
a temperature sensing unit located around a refrigerant discharge portion outside the compressor to sense a refrigerant discharge temperature from the compressor;
an inverter including a plurality of switching elements to convert a direct current (DC) voltage into an alternating current (AC) voltage and to supply the AC voltage to a motor used to drive the compressor;
an output current detector to detect output current flowing in the motor; and
a controller to control the inverter based on the output current flowing in the motor,
wherein the controller performs control to apply motor preheating current for preheating of the motor based on a discharge temperature command value of the compressor during a first period for preheating before startup of the motor, and depending on the sensed temperature varies (a) a time during which the motor preheating current is applied or (b) a current application level,
wherein the controller performs control to increase the time during which the motor preheating current is applied or to increase the current application level, as the sensed temperature is reduced,
wherein the output current detector does not detect output current during the first period,
wherein the controller controls a motor alignment period, a motor speed increasing period, and an ordinary motor operating period to be performed after the first period,
wherein the controller performs start the motor after the first period,
when the sensed temperature is a first temperature, the controller performs control to cause constant direct current having a first level to flow in the motor during the first period, performs control to cause direct current having a second level which is greater than the first level to flow in the motor during the motor alignment period,
when the sensed temperature is a second temperature which is lower than the first temperature, the controller performs control to cause constant direct current having a third level which is greater than the first level and the second level to flow in the motor during the first period,
wherein the controller includes:
a current command generator to generate a preheating current command value, based on the temperature sensed by the temperature sensing unit and the discharge temperature command value of the compressor, during the first period;

a voltage command generator to generate a preheating voltage command value based on the preheating current command value during the first period;

a switching control signal output unit to output a preheating switching control signal, based on the preheating voltage command value, for allowing the motor preheating current to flow in the motor during the first period, and a speed calculator to calculate a speed of the motor based on the output current flowing in the motor after the first period, wherein the current command generator generates a current command value based on a speed command value and the speed calculated by the speed calculator after the first period, wherein the voltage command generator generates a voltage command value based on the current command value after the first period, and wherein the switching control signal output unit outputs a switching control signal based on the voltage command value after the first period.

5. The home appliance of claim 4, wherein the controller performs control to turn on one upper-arm switching element among three upper-arm switching elements in the inverter and to turn on two lower-arm switching elements among three lower-arm switching elements in the inverter during the first period.

6. The home appliance of claim 4, wherein the switching control signal output unit outputs the preheating switching control signal to turn on one upper-arm switching element among three upper-arm switching elements in the inverter and to turn on two lower-arm switching elements among three lower-arm switching elements in the inverter during the first period.

7. The home appliance of claim 4, wherein the home appliance is one of an air conditioner, a refrigerator, and a water purifier.

* * * * *